United States Patent
Coburn et al.

(10) Patent No.: US 11,673,434 B2
(45) Date of Patent: Jun. 13, 2023

(54) EXTERNAL VEHICLE TIRE PRESSURE SIGNALING

(71) Applicant: Rivian IP Holdings, LLC, Plymouth, MI (US)

(72) Inventors: Matthew Joseph Coburn, Milford, MI (US); Rahul Madineni, Farmington Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 336 days.

(21) Appl. No.: 16/944,306

(22) Filed: Jul. 31, 2020

(65) Prior Publication Data

US 2022/0032695 A1 Feb. 3, 2022

(51) Int. Cl.
B60C 23/04 (2006.01)

(52) U.S. Cl.
CPC ...... B60C 23/0403 (2013.01); B60C 23/0471 (2013.01); B60C 23/0484 (2013.01)

(58) Field of Classification Search
CPC . B60C 23/0484; B60C 23/0406; B60C 23/00; G08B 3/00; G01L 17/00
USPC ............................................ 701/36; 340/442
See application file for complete search history.

(56) References Cited

U.S. PATENT DOCUMENTS

| 7,053,761 | B2 * | 5/2006 | Schofield | B60R 1/12 |
| | | | | 340/447 |
| 7,068,158 | B2 * | 6/2006 | Komatsu | B60C 23/0408 |
| | | | | 73/146.4 |
| 8,525,657 | B2 * | 9/2013 | Patel | B60C 23/0408 |
| | | | | 340/447 |
| 10,252,584 | B2 * | 4/2019 | Juzswik | B60C 23/0484 |
| 2003/0058090 | A1 * | 3/2003 | Schofield | B60R 1/12 |
| | | | | 340/425.5 |
| 2005/0160805 | A1 * | 7/2005 | Taki | B60C 23/0406 |
| | | | | 73/146 |
| 2006/0220813 | A1 * | 10/2006 | Utter | B60C 23/0408 |
| | | | | 73/146 |
| 2011/0205047 | A1 * | 8/2011 | Patel | B60R 25/00 |
| | | | | 340/447 |

(Continued)

FOREIGN PATENT DOCUMENTS

| EP | 1878595 A2 * | 1/2008 | ......... B60C 23/0401 |
| WO | WO-2020018097 A1 * | 1/2020 | ......... B60C 23/0401 |
| WO | WO-2020018099 A1 * | 1/2020 | ......... B60C 23/0401 |

*Primary Examiner* — Eric Blount
(74) *Attorney, Agent, or Firm* — Clements Bernard Walker; Christopher L. Bernard (57) ABSTRACT

Disclosed embodiments include apparatuses, systems, and methods for providing a sound indicative of a pressure of a tire relative to a target pressure. A target pressure specifier is configured to specify a target pressure for a tire and generate a target pressure signal indicative of the target pressure. A pressure monitor is configured to receive the target pressure signal, a current pressure signal indicative of a current pressure of the tire, and an indicator of a deliberate change in the current pressure and compare the current pressure signal with the target pressure signal responsive to the indicator. A status signal is generated indicative of a status of the current pressure signal relative to the target pressure signal. An audio generator is configured to receive the status signal and to generate a sound audible outside of the passenger compartment of the vehicle that is indicative of the status signal.

20 Claims, 9 Drawing Sheets

(56) References Cited

U.S. PATENT DOCUMENTS

2021/0138850 A1\* 5/2021 Phillips .............. B60C 23/0484

\* cited by examiner

EXTERNAL VEHICLE TIRE PRESSURE SIGNALING

INTRODUCTION

The present disclosure relates to apparatuses, systems, and methods for checking and adjusting tire pressure.

The statements in this section merely provide background information related to the present disclosure and may not constitute prior art.

Inflating tires to their proper pressure level is important for many reasons. When tires are underinflated, the handling and stability of a vehicle may be reduced, thereby helping contribute to making driving less safe. Underinflated tires may be more likely to contribute to overheating and causing a blowout. Underinflated tires also may contribute to reduce fuel economy. When tires are overinflated, the vehicle's ride may be stiff and uncomfortable. Both underinflation and overinflation may help contribute to uneven wear on the tires and may help contribute to reducing life of the tires.

Checking and adjusting tire pressure may be a cumbersome task. In addition to setting up a pump or compressor or driving to a service station that has a compressor and then removing valve caps from each of the tires, one must determine what the appropriate tire pressure should be. The appropriate tire pressure may be different for different vehicles, for front and rear tires, and for different uses of the same vehicle. The appropriate tire pressure may be retrieved from an owner's manual or read from a marker on a door post.

The individual then goes through the process of checking and adjusting the pressure of each tire. Adjusting the tire pressure may involve applying a pressure gauge to the valve stem of the tire to check the pressure level. If the pressure is too high, the individual presses the valve pin of the valve stem to release some pressure and then check the tire pressure again.

This process of applying and removing the pressure gauge and/or pressing the valve stem is repeated until the desired tire pressure is attained. If too much pressure has been released and the tire pressure is too low, or if a first application of the pressure gauge indicates that the tire pressure was too low, then pressure has to be added to the tire with a compressor hose. As with releasing excess pressure, adding pressure to the tire may involve the repeated swapping of the pressure gauge and the compressor hose until the tire pressure reaches the desired level.

Many service stations or compressors have a built-in pressure gauge that will indicate the pressure of the tire. However, with countless people using the compressor, potentially over many years, there is no way to know if the gauge is accurate. Moreover, it may be difficult to read the gauge when the gauge is on the face of a pump station at the other end of the compressor hose (possibly more than a dozen feet away and/or obstructed from view because part of the vehicle may be positioned between the tire and the gauge). Even if one can read the gauge, checking the gauge may involve repeatedly moving one's eyes between the valve stem and the gauge, all the while keeping in mind what the pressure level of each tire should be.

SUMMARY

Disclosed embodiments include apparatuses, systems, and methods for providing sound indicative of a pressure of a tire relative to a target pressure.

In an illustrative embodiment, an apparatus includes a target pressure specifier is configured to specify a target pressure for a tire of the vehicle and generate a target pressure signal indicative of the target pressure. A pressure monitor is configured to receive the target pressure signal, a current pressure signal indicative of a current pressure of the tire, and an indicator of a deliberate change in the current pressure of the tire, and then compare the current pressure signal with the target pressure signal responsive to the indicator. A status signal is generated indicative of a status of the current pressure signal relative to the target pressure signal. An audio generator is positioned on the vehicle where the audio generator is configured to receive the status signal and to generate a sound audible outside of the passenger compartment of the vehicle that is indicative of the status signal.

In another embodiment, a vehicle includes a passenger compartment. A drive system is configured to motivate, accelerate, decelerate, stop, and steer the vehicle. The vehicle also includes an external tire pressure indicator. A target pressure specifier is configured to specify a target pressure for a tire of the vehicle and generate a target pressure signal indicative of the target pressure. A pressure monitor is configured to receive the target pressure signal, a current pressure signal indicative of a current pressure of the tire, and an indicator of a deliberate change in the current pressure of the tire, and then compare the current pressure signal with the target pressure signal responsive to the indicator. A status signal is generated indicative of a status of the current pressure signal relative to the target pressure signal. An audio generator is positioned on the vehicle where the audio generator is configured to receive the status signal and to generate a sound audible outside of the passenger compartment of the vehicle that is indicative of the status signal.

In another embodiment, in an illustrative method a target pressure signal indicative of a target pressure for a tire of a vehicle is received. A current pressure signal indicative of a current pressure of the tire is received. An indication of a deliberate change in the current pressure of the tire is received. The target pressure signal is compared with the current pressure signal responsive to the indication of the deliberate change in the current pressure of the tire. The status signal indicative of a status of the current pressure signal relative to the target pressure signal is generated. The status signal is provided to an audio generator positioned on the vehicle where the audio generator is configured to receive the status signal and to generate a sound indicative of the status signal that is audible outside of a passenger compartment of the vehicle.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description explains, by way of illustration only and not of limitation, various embodiments of apparatuses, systems, and methods for providing sound indicative of a pressure of a tire relative to a target pressure. It will be noted that the first digit of three-digit reference numbers correspond to the figure number in which the element first appears.

By way of a non-limiting introduction and overview, in various embodiments, a target pressure specifier is used to specify a target pressure for a tire of a vehicle and a target pressure signal indicative of the target pressure is generated. A pressure monitor receives the target pressure signal and a current pressure signal indicative of a current pressure of the tire. In response to an indicator of a deliberate change being made in the current pressure of the tire, such as when an individual is checking or adjusting the pressure of the tire, the pressure monitor compares the current pressure signal with the target pressure signal. The pressure monitor then generates a status signal indicative of a status of the current pressure relative to the target pressure based on the current pressure signal and target pressure signal. An audio generator positioned on the vehicle receives the status signal and generates a sound audible outside of a passenger compartment of the vehicle indicative of the current pressure of the tire relative to the target pressure.

For example, if the current tire pressure is at or within a predetermined range of the target pressure, the audio generator may generate a first sound; when the tire pressure is lower than the target pressure, the audio generator may generate a second sound; when the tire pressure is greater than the target pressure, the audio generator may generate a third sound. Hearing the different sounds, which may be generated from transducers which may be positioned outside of the passenger compartment toward the front and/or the rear of the vehicle, the individual is informed of the status of the pressure in each tire without having to remove a compressor hose to apply a pressure gauge to the valve stem or having to look away from the valve stem to read another external gauge.

Now that an overview has been given, details of various embodiments will be explained by way of non-limiting examples given by way of illustration only and not of limitation.

Figure 1:
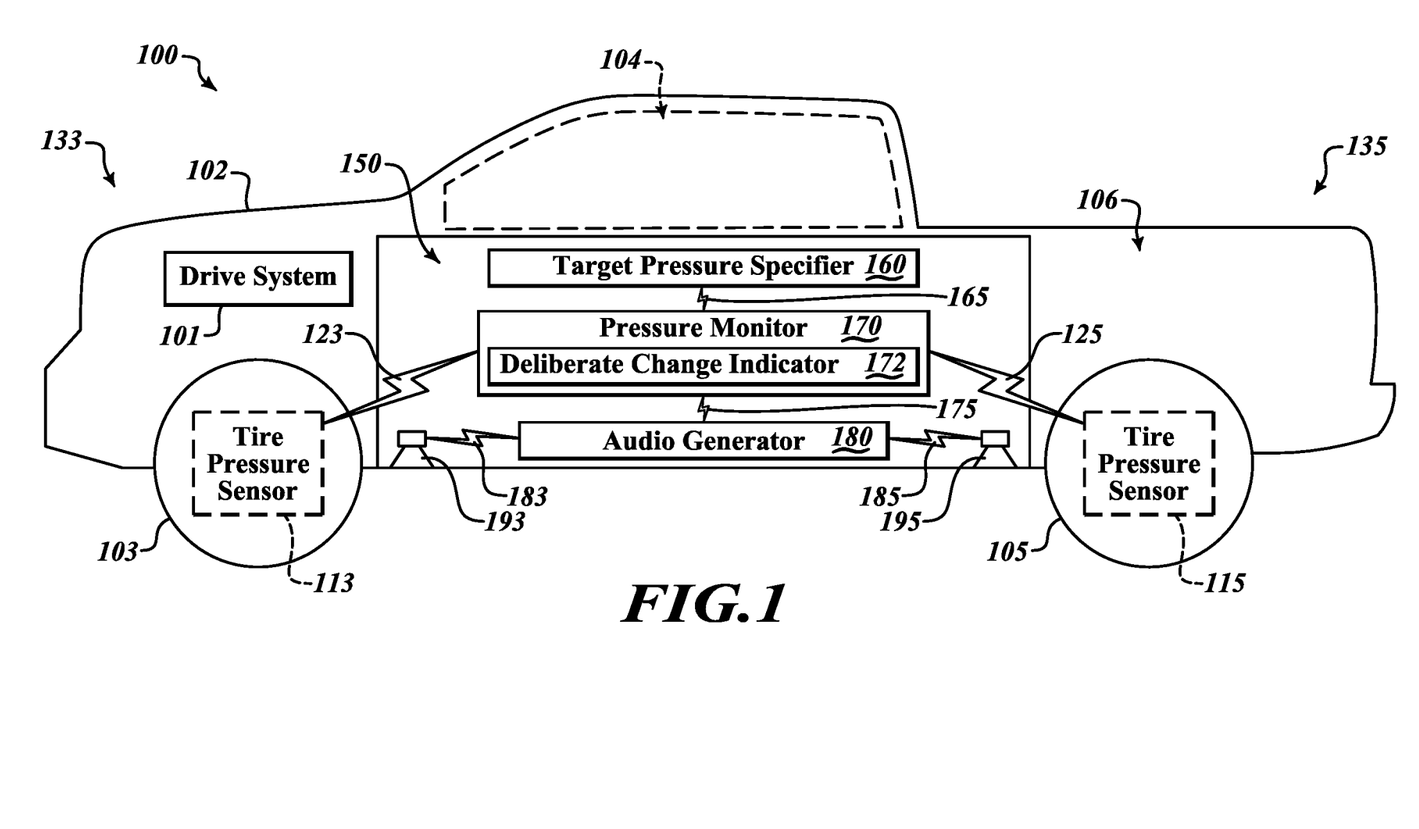
FIG. 1 is a block diagram in partial schematic form of a vehicle equipped with an illustrative external pressure indicator.

Referring to FIG. 1, in various embodiments an illustrative vehicle 100 includes a vehicle body 102, a passenger compartment 104 for receiving one or more occupants, a cargo section 106 such as a trunk or truckbed, and a drive system 101 to control, motivate, accelerate, steer, and/or stop the vehicle. The drive system 101 may be manually controlled by an operator (not shown in FIG. 1) within the passenger compartment 104 using control surfaces to control the speed and heading of the vehicle 100. The drive system 101 also may provide for automated driving or assisted driving using operator assistance features (not shown in FIG. 1). The drive system 101 may be powered by electric power, gasoline, or diesel fuel, or may include a hybrid drive system combining more than one of these technologies. The vehicle 100 includes one or more front tires 103 positioned toward a front end 133 of the vehicle 100 and one or more rear tires 105 positioned toward a rear end 135 of the vehicle 100.

Still referring to FIG. 1, in various embodiments the vehicle 100 includes an external tire pressure indicator 150. The external tire pressure indicator 150 includes a target pressure specifier 160, a pressure monitor 170, and an audio generator 180. As further described below, the target pressure specifier 160 allows an individual to specify the target pressure of each of the one or more tires 103 and/or 105. The target pressure specifier 160 generates a target pressure signal 165 representative of the target pressure for each of the one or more tires 103 and/or 105.

The pressure monitor 170 is configured to receive the target pressure signal 165 from the target pressure specifier 160 and one or more current pressure signals 123 and/or 125 from the one or more tires 103 and/or 105. In various embodiments, in response to receiving a signal from a deliberate change indicator 172 that a change in pressure of one or more of the tires 103 and/or 105 has been initiated, the pressure monitor compares the current pressure signal 123 or 125 from a tire 103 or 105, respectively, with the target pressure signal 165. Based on the comparison, the pressure monitor 170 is configured to generate a status signal 175 indicating whether the current pressure signal 123 or 125 shows that the pressure in the tire 103 or 105 is equal to, less than, or greater than the target pressure indicated by the target pressure signal 165.

In various embodiments the audio generator 180 is configured to receive the status signal 175 from the pressure monitor and to send an audio signal 183 and/or 185 to one or more transducers 193 and/or 195. The transducers 193 and/or 195 may be mounted outside of the passenger compartment 104 or otherwise positioned so that the sound generated by the one or more transducers 193 and/or 195 are audible outside of the passenger compartment 104. Enabling the sound to be audible outside of the passenger compartment enables an individual checking and/or adjusting the pressure in one or more of the tires 103 and/or 105 to hear the sound. In various embodiments, the audio signal 183 or 185 is generated and sent to the transducer 193 or 195 based on which of the tires 103 or 105, respectively, is having its pressure adjusted. For example, when the pressure of the tire 103 is being checked or adjusted, the audio generator 180 may send the audio signal 183 to the transducer 193 toward the front end 133 of the vehicle 100 because the transducer 193 is closer to the tire 103. Correspondingly, when the pressure of the tire 105 is being checked or adjusted, the audio generator 180 may send the audio signal 185 to the transducer 195 toward the rear end 135 of the vehicle 100 because the transducer 195 is closer to the tire 105.

In various embodiments, the audio signals 183 and/or 185 may be varied depending on the current tire pressure of the tire relative to the target pressure. In the example of a front tire 103, when the current pressure signal 123 is at or within a predetermined tolerance of the target pressure 165 for the front tire 103, the audio generator 180 may generate a first sound. When the current tire pressure signal 123 is lower than the target pressure signal 165 for the front tire 103, the audio generator 180 may generate a second sound. When the current tire pressure signal 123 is greater than the target pressure signal 165 for the front tire 103, the audio generator 180 may generate a third sound. The sounds may be similarly modulated based on the current tire pressure signal 125 for the rear tire 105. Hearing the sound, the individual checking or adjusting the tire pressure of a tire is informed whether the tire pressure is correct, too low, or too high, and respond accordingly.

Figure 2:
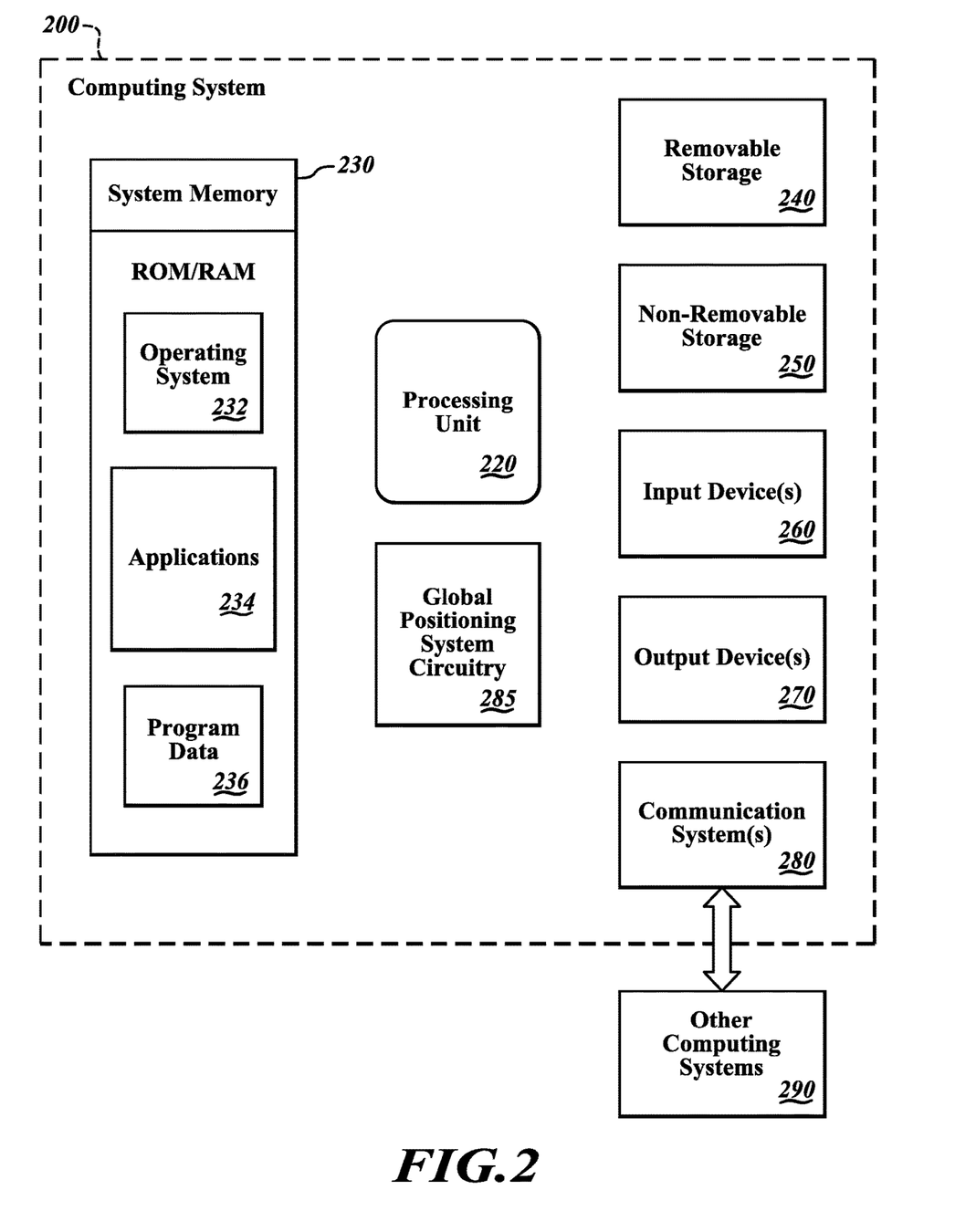
FIG. 2 is a block diagram of an illustrative computing system for performing functions of the external pressure indicator of FIG. 1.

Referring additionally to FIG. 2 and given by way of example only and not of limitation, an illustrative computing system 200 may be used aboard the vehicle 100 (FIG. 1) to perform the functions of the external tire pressure indicator 150 (FIG. 1). In various embodiments, the computing system 200 typically includes at least one processing unit 220 and a system memory 230. Depending on the exact configuration and type of computing device, the system memory 230 may be volatile memory, such as random-access memory ("RAM"), non-volatile memory, such as read-only memory ("ROM"), flash memory, and the like, or some combination of volatile memory and non-volatile memory. The system memory 230 typically maintains an operating system 232, one or more applications 234, and program data 236. The operating system 232 may include any number of operating systems executable on desktop or portable devices including, but not limited to, Linux, Microsoft Windows®, Apple OS®, or Android®, or a proprietary operating system.

The computing system 200 may also have additional features or functionality. For example, the computing system 200 may also include additional data storage devices (removable and/or non-removable) such as, for example, magnetic disks, optical disks, tape, or flash memory. Such additional storage is illustrated in FIG. 2 by removable storage 240 and non-removable storage 250. Computer storage media may include volatile and non-volatile, removable and non-removable media implemented in any method or technology for storage of information, such as computer-readable instructions, data structures, program modules or other data. The system memory 230, the removable storage 240, and the non-removable storage 250 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing system 200. Any such computer storage media may be part of the computing system 200.

The computing system 200 may also have input device(s) 260 such as a keyboard, stylus, voice input device, touch-screen input device, etc. Output device(s) 270 such as a display, speakers, short-range transceivers such as a Bluetooth transceiver, etc., may also be included. The computing system 200 also may include one or more communication systems 280 that allow the computing system 200 to communicate with other computing systems 290, as further described below. As previously mentioned, the communication system 280 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

In further reference to FIG. 2, the computing system 200 may include global positioning system ("GPS") circuitry 285 that can automatically discern its location based on relative positions to multiple GPS satellites. As described further below, GPS circuitry 285 may be used to determine a location of the vehicle 100. In various embodiments, the GPS circuitry 285 may be used to determine if the vehicle is operating on-road or off-road and may recommend an appropriate target tire pressure for the conditions.

In addition to one or more onboard computing systems as described with reference to FIG. 2, various embodiments may communicate with remote computing systems to perform the functions herein described. For example, current pressure signals 123 and/or 125 collected from tire pressure sensors 113 and/or 115 may be relayed to a remote computing system where the current pressure signals 123 and/or 125 are compared to a target pressure signal 165 and then send the status signal 175 back to the vehicle 100 for generation of sounds indicating whether the current pressure of the tires is correct, too low, or too high.

Figure 3:
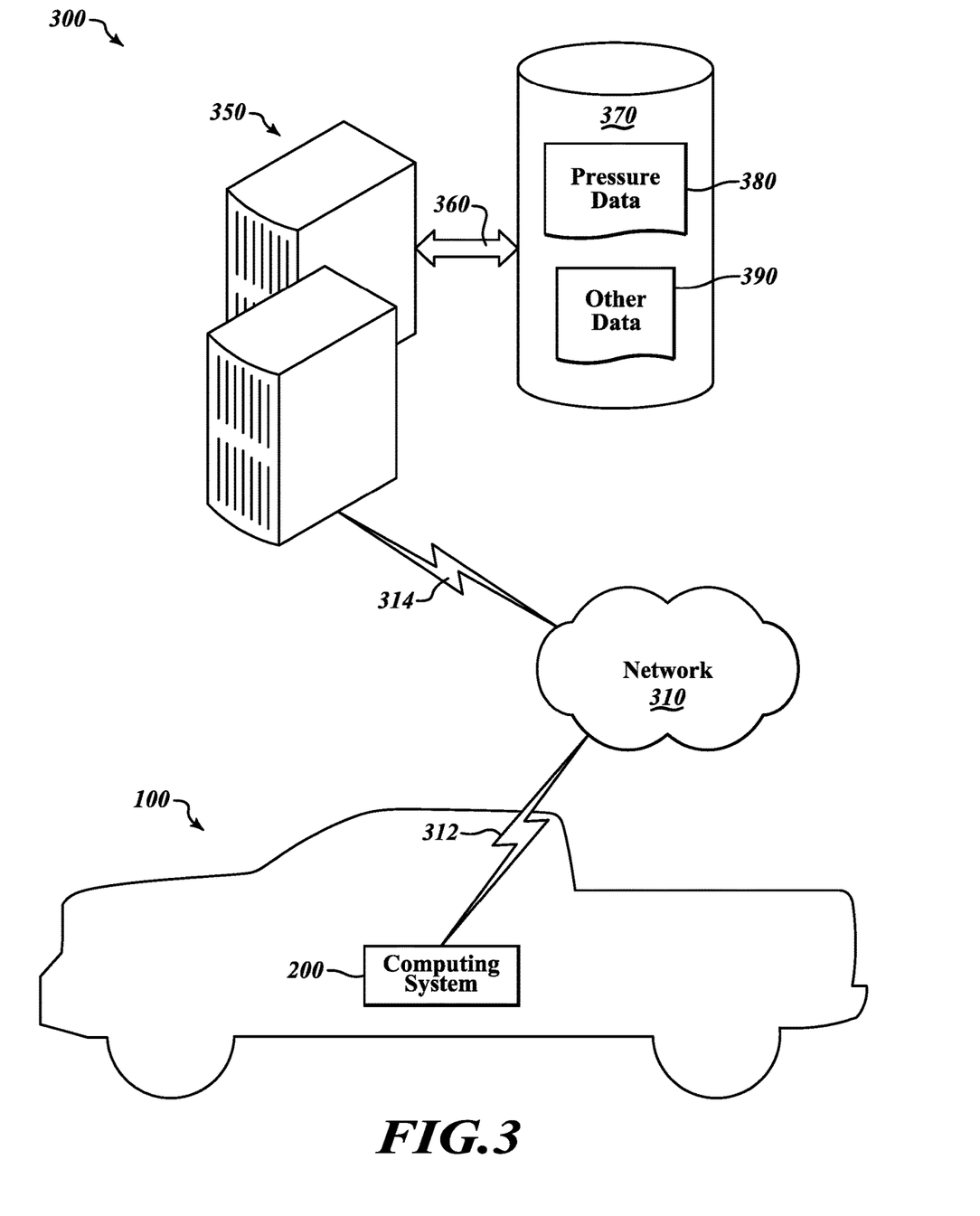
FIG. 3 is a block diagram of an illustrative computing environment in which an on-board computing system communicates with a remote computing to perform functions of the external pressure indicator.

Referring to FIG. 3, an operating environment 300 may include a remote computing system 350 that, for example, is configured to communicate with the tire pressure sensors 113 and/or 115 aboard the vehicle 100 (FIG. 1), potentially through the computing system 200 used to relay the information. The remote computing system 350 may receive the current tire pressure signals 123 and/or 125 (FIG. 1) from the computing system 200 via a network 310. The tire pressure sensors 113 and/or 115 may be transmitted by the computing system 200 to the network 310 via a wireless communications link 312, such as a satellite, cellular, or Wi-Fi communications link. When the vehicle 100 is parked, it is also possible that the computing system 200 may be coupled to the network 300 a wired network link, such as a universal serial bus (USB) or Ethernet connection, which may be part of a wiring harness used to charge the vehicle 100 when it is an electric or hybrid vehicle. The remote computing system 350, which may include a server or server farm, may also communicate with the network 310 over wired and/or wireless communications links 314. The remote computing system 350 may access programming and data used to perform its functions over a high-speed bus 360 with data storage 370.

Information maintained in the data storage 370 may include pressure data 380 from which the target pressure signal 165 (FIG. 1) may be extracted for the vehicle 100 and/or its operating environment. The data storage 370 also may store or receive other data, such as current pressure data that potentially may be used to track data for tire or vehicle maintenance.

It will be appreciated that functions of the external tire pressure indicator 150 may be distributed between the computing system 200 aboard the vehicle and the remote computing system 350. It will be appreciated that embodiments herein disclosed are not limited to performing functions of these systems at any particular location or on any particular system.

Figure 4:
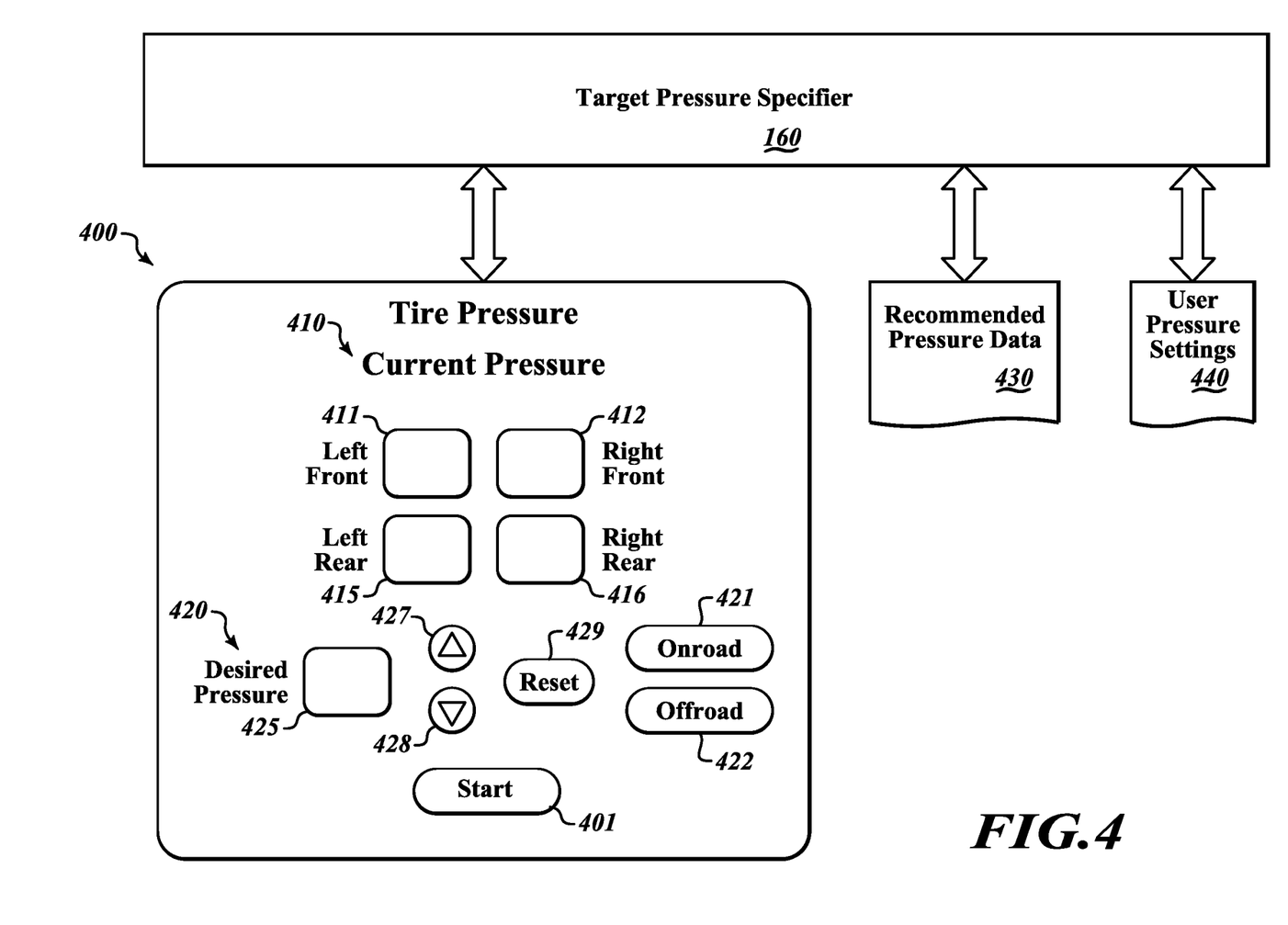
FIG. 4 is a block diagram of an illustrative target pressure specifier of the external pressure indicator.

Use and operation of embodiments of the external tire pressure indicator 150 of FIG. 1 are explained in further detail with reference to FIGS. 4-9. Referring to FIG. 4, a process of checking or adjusting pressure of one or more tires 103 and/or 105 may begin with a user input at a control panel 400 to specify target tire pressure. The control panel 400 is communicatively coupled with the target pressure specifier 160. The control panel 400 may include a current pressure section 410 and a target pressure section 420. The current pressure section 410 may report data representing tire pressures 411-415 using the current tire pressure signals 123 and/or 125 generated by the tire pressure sensors 123 and/or 125. In various embodiments, the current pressure section 410 may be accessible even when an individual is not in the process of changing or checking the tire pressure.

In various embodiments, the desired pressure section 420 of the control panel 400 is used when an individual is checking and/or adjusting the tire pressure. As previously mentioned with reference to FIG. 1, a deliberate change indicator 162 may signal a deliberate change in the current pressure of one or more tires to initiate operation of the pressure monitor 170. In various embodiments, an individual may engage a start button 401 or a similar control on the control panel 400 to initiate operation of the pressure monitor 170 to compare the current tire pressure signals 123 and/or 125 with the target pressure signal 165. Additionally, applying a tool, such as a compressor nozzle, to one of the tires 103 or 105 as further explained below may be detected by a sensor to cause the pressure monitor 170 to compare the current tire pressure signals 123 and/or 125 with the target pressure signal 165.

The control panel 400 may be used to specify the target pressure. When the start button 401 is triggered or another event triggers operation of the pressure monitor 170, a desired pressure indicator 425 may display the target pressure for one or more of the tires 103 and 105. The target pressure identified by the desired pressure indicator 425 may default to a recommended tire pressure that is maintained in a store of recommended pressure data 430 in communication with the target pressure specifier 160. In various embodiments, if an individual has varied the pressure settings to provide for a softer ride, to allow for vehicle loading, or other factors, the default tire pressure may be based on user pressure settings 440 maintained by the target pressure specifier 160. When an individual wants to increase or decrease the values, manual adjustment buttons 427 and 428 may be used to increase or decrease the target pressure level, respectively. If the individual wishes to discard any adjustments the individual has, a reset button 429 may be used to restore previously-supplied default values.

In various embodiments, an onroad selector 421 and an offroad selector 422 may be provided to allow the user to select setting for onroad and offroad driving, respectively, from the recommended pressure data 430 and/or the user pressure settings 440. In general, a lower tire pressure is recommended for off-road driving to accommodate uneven terrain, and the recommended pressure data 430 and/or the user pressure settings 440 may include separate setting for onroad and offroad driving that may be accessed with the onroad selector 421 and the offroad selector 422, respectively.

The control panel 400 allows for the target pressure specifier 160 to generate the target pressure signal 165 which is a reasonable starting point in a tire pressure adjustment operation. Having specified the target pressure values provides the target for pressure checking and/or adjustment.

Figure 5:
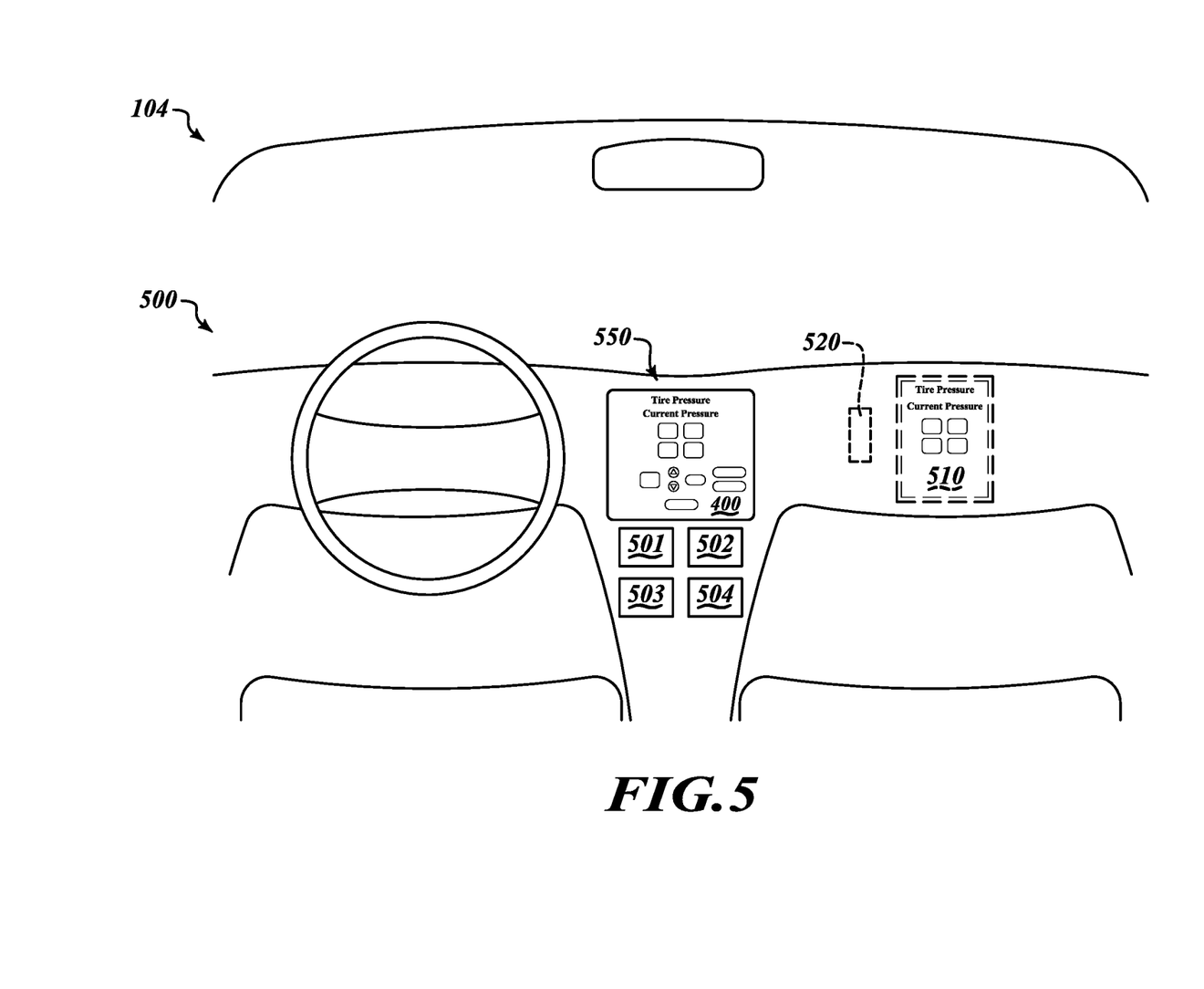
FIG. 5 is a block diagram in partial schematic form of an illustrative dashboard of a vehicle.

Referring to FIG. 5, a dashboard 500 within the passenger compartment 104 shows a display 550 on which the control panel 400 of the target pressure specifier (FIGS. 1 and 4) may be presented. In various embodiments, the display 550 may include a touchscreen display that enables an individual to directly engage the display 550 to make or change settings. In various embodiments where the display 550 does not include a touchscreen display, controls 501-504 adjacent to the display 550 may enable operation of the control panel 400.

In various embodiments, instead of or in addition to using the display 550 on the dashboard 500, a portable computing device 510, such as a smartphone, smartwatch, tablet computer, or other portable computing device, may execute an application that operates as an onboard computing system 200 (FIG. 2) and that supports functions of the external tire pressure indicator 150 (FIG. 1). The portable computing device 510 may operate alone or in some combination with a remote computing system 350 (FIG. 3) as previously explained. The portable computing device 510 engages with other systems, such as the tire pressure sensors 113 and/or 115 and the audio generator 180 (FIG. 1) via an interface 520. The interface may include a wireless interface, such as a Bluetooth or Wi-Fi interface, or a wired interface using a USB or other wired connection.

Figure 6:
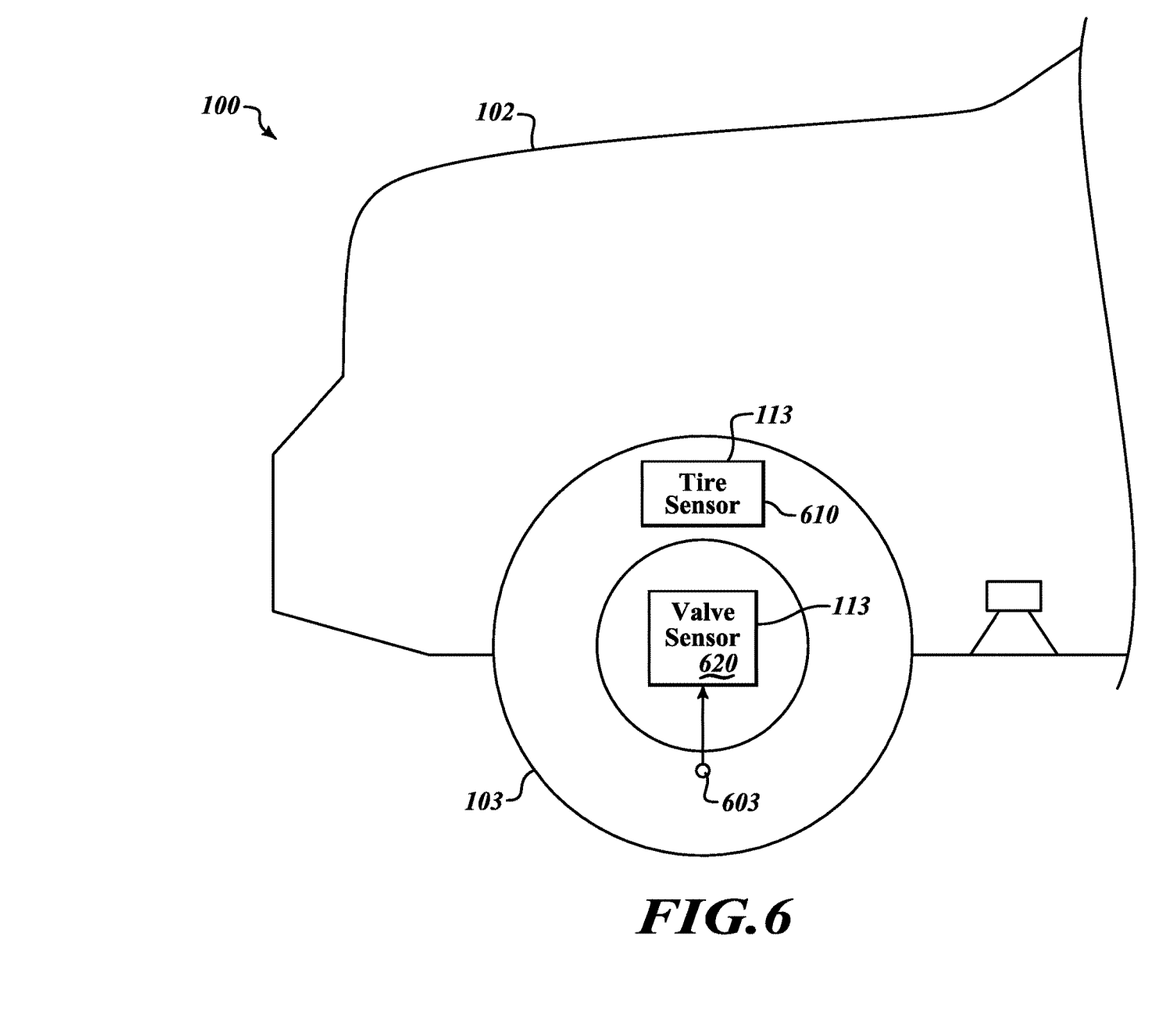
FIG. 6 is a block diagram in partial schematic form of tire pressure sensors providing data to the pressure monitor of FIG. 1.

Referring to FIG. 6, when an individual checks or adjusts the tire pressure, such as by using a compressor nozzle 725, the tire pressure sensor 113 (for the front tire 103, as in the example of FIGS. 6 and 7) measures the current pressure of the tire 103. In various embodiments, the tire pressure sensor 113 may include a tire sensor 610 disposed within the tire 103 or otherwise coupled with the tire 103 to measure the current tire pressure. In various embodiments, the tire pressure sensor 113 may include a valve sensor 620 that is coupled with a valve stem 603 of the tire 103 through which pressurized gas is introduced into or removed from the tire 103. The valve sensor 620 may be used to measure the pressure of the tire 103 and to detect a deliberate change in the pressure of the tire caused by an individual engaging a valve stem pin to release pressure from or add pressure to the tire 103. Thus, the valve sensor 620 may send a signal presenting the indicator of the deliberate change in the pressure of the tire that is detected by the deliberate change indicator 172 of the pressure monitor 170.

Figure 7:
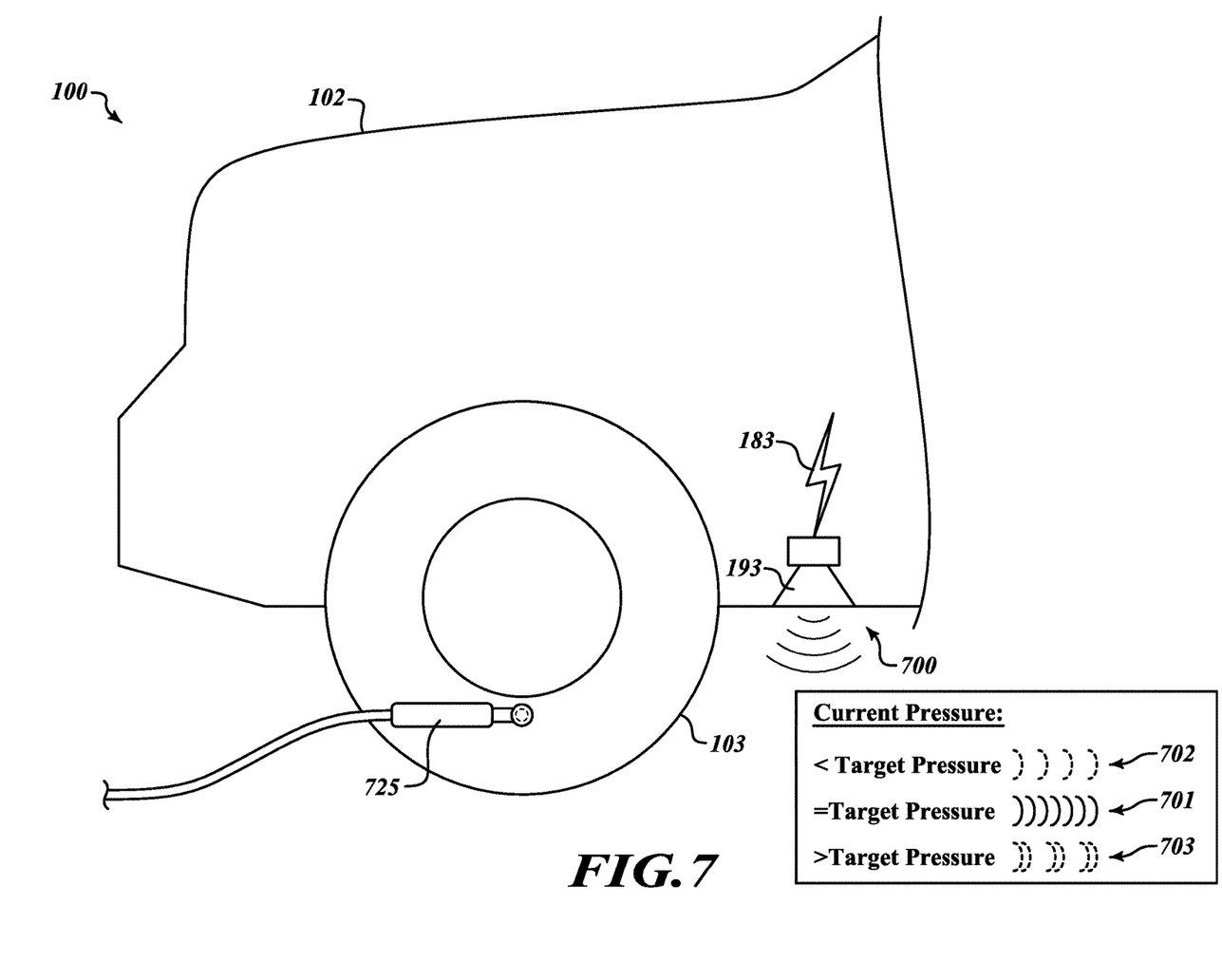
FIG. 7 is a block diagram in partial schematic form of a transducer generating a sound responsive to a deliberate pressure change of a tire.

Referring to FIG. 7, when the individual has initiated the checking or changing of pressure in the tire 103, as previously described, the external tire pressure indicator 150 of FIG. 1 causes sounds 700 to be generated that are audible outside of the passenger compartment 104 (FIG. 1) of the vehicle 100. The sounds 700 may be detected by the individual checking or changing the tire pressure to inform the individual whether the pressure is too low, equal to the target pressure, or too high. In various embodiments, the audio signal 183 is generated by the audio generator 180 (FIG. 1) and sent to the transducer 193 to generate the sound 700. The transducer 193 may include a speaker, a piezoelectric crystal, or another transducer configured to generate sound in response to receipt of an electrical signal. The audio signal may be presented via a wired or wireless connection to the transducer 193.

In various embodiments, the transducer 193 may be mounted outside of the passenger compartment 104 (FIG. 1) of the vehicle to facilitate the sound 700 generated being detectable outside of the vehicle 100. However, it will be appreciated that in some embodiments the transducer 193 may be disposed within the passenger compartment 104, in the cargo section 106 (FIG. 1) or in another location on the vehicle 100 provided that the sound 700 generated is detectable outside of the passenger compartment 104. It will be appreciated that the sound 700 desirably is detected outside of the passenger compartment 104 because the individual checking or changing the pressure of the tire 103 will be outside of the passenger compartment 104 while working with the tire 103.

In various embodiments, the sound 700 is modulated to produce different sounds to communicate the status of the pressure of the tire 103. For example, the audio signal 183 may cause the transducer 193 to produce a first sound 701 to signal when the pressure of the tire 103 is at the target pressure. The first sound 701, for example, may be a steady tone or a tone at a pitch that is associated with the pressure of the tire 103 being at the target pressure. In various embodiments, it will be appreciated that the current pressure in the tire may be regarded as being at the target pressure when the current pressure is within a predetermined tolerance of the target pressure, such as being within five-percent or so of the target pressure or within some other predetermined range of the target pressure.

When the current tire pressure is not at the target pressure (or within the predetermined tolerance of the target pressure), the audio signal 183 may cause the transducer 193 to modulate the sound 700 to generate different sounds to indicate whether the current tire pressure is less than or greater than the target pressure. For example, the audio signal 183 may be configured to cause the transducer 193 to generate a pulsed tone at a relatively low pulse rate 702 to signal that the current pressure of the tire 103 is less than the target pressure. Hearing this sound, the individual will know to add pressure to the tire 103 to bring the current tire pressure to the target pressure. On the other hand, the audio signal 183 may be configured to cause the transducer 193 to generate a pulsed tone at a relatively high pulse rate 703 to signal that the current pressure of the tire 103 is greater than the target pressure. Hearing this sound, the individual will know to release pressure from the tire 103, such as by pressing the pin on the valve stem, thereby bringing the current tire pressure toward the target pressure.

It will be appreciated that the sound 700 could be modulated to produce any number of sounds that would indicate to an individual whether the current pressure of the tire 103 is at the target pressure or whether pressure should be added or removed from the tire 103. For example, a pitch or frequency of the sound 700 could be varied to signal how the current pressure of the tire 103 compares to the target pressure. Also, the sound 700 may include a synthesized voice signal that reports "equal to target pressure," "less than target pressure," and "greater than target pressure"; "at target pressure," "add pressure," or "release pressure"; or another string of signals to communicate the status of the current pressure to the individual.

Figure 8:
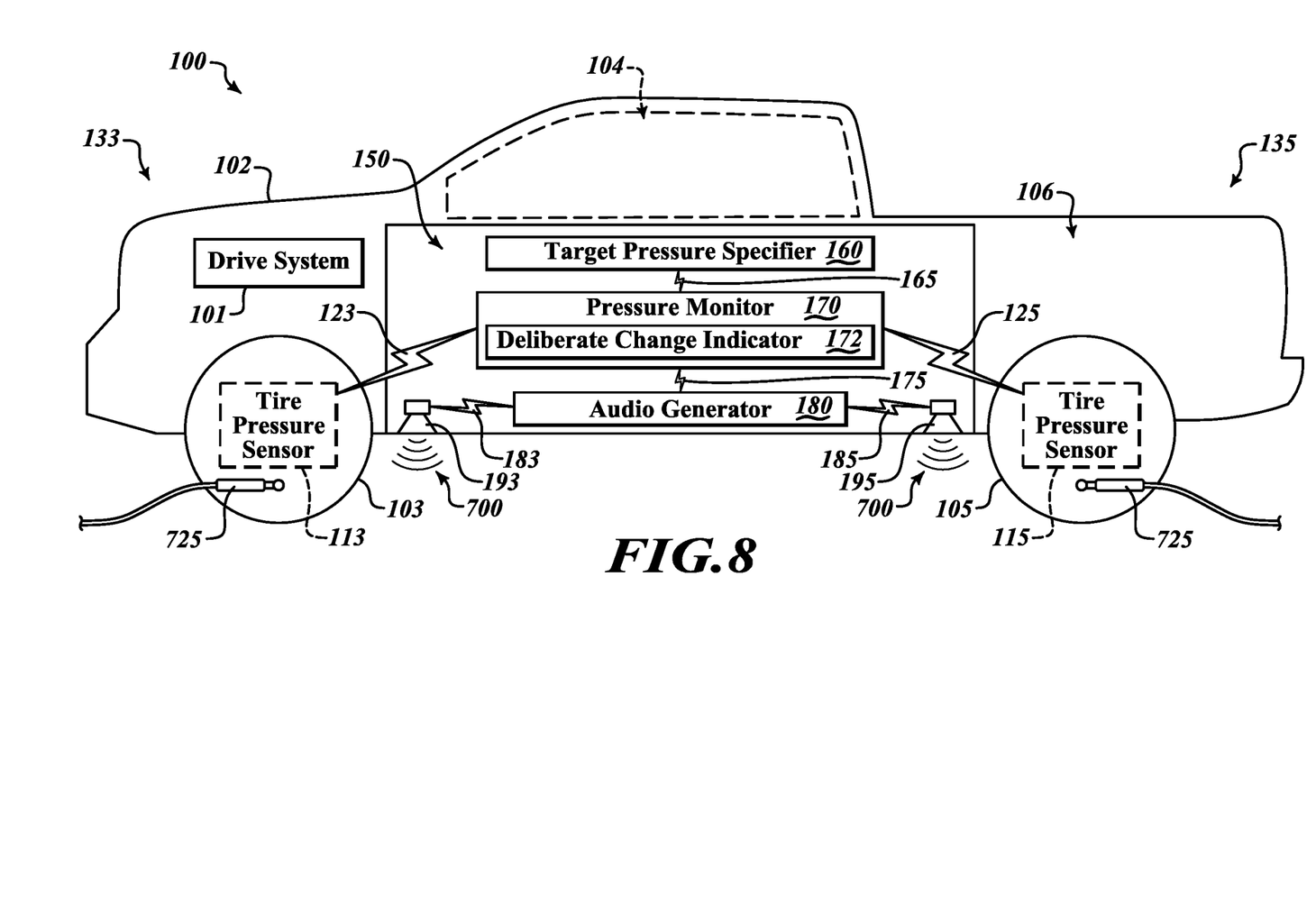
FIG. 8 is a block diagram in partial schematic form of the vehicle of FIG. 1 in operation.

Referring to FIG. 8, in various embodiments, the sound 700 is generated by a different transducer 193 or 195 depending upon which of the tires 103 or 105 is having its pressure checked or changed. For example, when the front tire 103 is having its pressure checked or changed, the external tire pressure indicator 150 (FIG. 1) may use the tire pressure sensor 103, such as the tire sensor 610 or the valve sensor 620 (FIG. 6), to determine when the compressor valve 725 is applied to the front tire 103. Accordingly, the audio generator 180 may send the audio signal 183 to the transducer 193 toward the front end 133 of the vehicle 100. By presenting the sound 700 at the transducer 193, the sound 700 is presented close to the front tire 103 where the individual is working, thereby making it easier for the individual to detect the sound 700 and/or allowing the sound 700 to be produced at a lower volume while still being detectable by the individual. Correspondingly, when the rear tire 105 is having its pressure checked or changed, the external tire pressure indicator 150 (FIG. 1) may use the tire pressure sensor 105, such as the tire sensor 610 or the valve sensor 620, to determine when the compressor valve 725 is applied to the rear tire 105. Accordingly, the audio generator 180 may send the audio signal 185 to the transducer 195 toward the rear end 135 of the vehicle 100. By presenting the sound 700 at the transducer 195, the sound 700 is presented close to the rear tire 105 where the individual is working, making it easier for the individual to detect the sound 700 and/or allowing the sound 700 to be produced at a lower volume while still being detectable by the individual.

Figure 9:
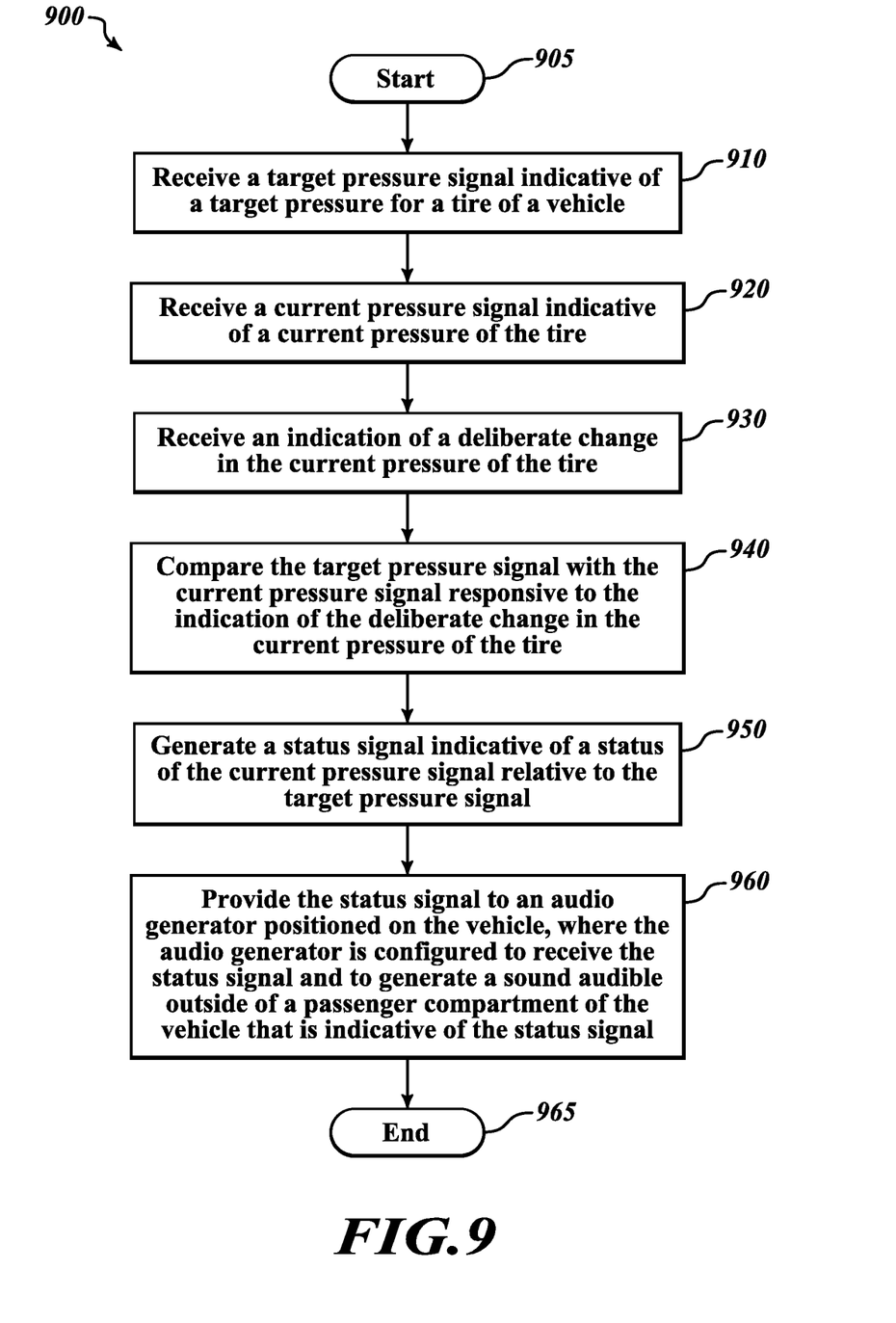
FIG. 9 is a flow chart of an illustrative method of providing tire pressure signals detectable outside of the passenger compartment of a vehicle.

Referring to FIG. 9, in various embodiments an illustrative method 900 is provided for providing a sound audible outside of a passenger compartment of a vehicle to indicate how the current pressure of a tire compares to a target pressure. The method 900 starts at a block 905. At a block 910, a target pressure signal indicative of a target pressure for a tire of a vehicle is received. At a block 920, a current pressure signal indicative of a current pressure of the tire is received. At a block 930, an indication of a deliberate change in the current pressure of the tire is received. At a block 940, responsive to the indication of the deliberate change in the current pressure of the tire, the target pressure signal is compared with the current pressure signal responsive to the indicator. At a block 950, a status signal indicative of a status of the current pressure signal relative to the target pressure signal is generated. At a block 960, the status signal is provided to an audio generator positioned on the vehicle where the audio generator is configured to receive the status signal and to generate a sound audible outside of a passenger compartment of the vehicle that is indicative of the status signal. The method 900 ends at a block 965.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
 a target pressure specifier configured to specify a target pressure for a tire of a vehicle and generate a target pressure signal indicative of the target pressure;
 a pressure monitor configured to receive the target pressure signal, a current pressure signal indicative of a current pressure of the tire, and an indicator of a deliberate change in the current pressure of the tire, the pressure monitor being further configured to compare the current pressure signal with the target pressure signal responsive to the indicator and generate a status signal indicative of a status of the current pressure signal relative to the target pressure signal; and an audio generator positioned on the vehicle, wherein the audio generator is configured to receive the status signal and to generate a sound audible outside of a passenger compartment of the vehicle that is indicative of the status signal;
wherein the indicator of the deliberate change in the current pressure of the tire includes an indicator received from a valve sensor configured to detect application of a pressure change device to a valve of the tire.

2. The apparatus of claim 1, wherein the target pressure specifier is configured to receive the target pressure from a source chosen from:
a user input; and
a store of recommended tire pressure.

3. The apparatus of claim 1, wherein the target pressure specifier includes:
a first target pressure setting for onroad travel and a second target pressure setting for offroad travel; and
a selector configured to receive a user mode selection of one of the first setting and the second setting.

4. The apparatus of claim 1, wherein the audio signal includes a first sound indicating when the current pressure is within a predetermined tolerance of the target pressure.

5. The apparatus of claim 4, wherein the audio signal includes one of:
a second sound indicating that the current pressure is less than the desired pressure; and
a third sound indicating that the current pressure is greater than the desired pressure.

6. The apparatus of claim 1, wherein the audio generator includes at least one transducer mountable outside of the passenger compartment of the vehicle and that is configured to generate the audio signal.

7. The apparatus of claim 6, wherein the external signal generator includes a front transducer mounted toward a front end of the vehicle and a rear transducer mounted toward a rear end of the vehicle.

8. The apparatus of claim 7, wherein the audio signal is generated via:
the front transducer when the indicator signals the deliberate change to the current pressure to the tire includes a front tire toward the front end of the vehicle; and
the rear transducer when the indicator signals the deliberate change to the current pressure to the tire includes a rear tire toward the rear end of the vehicle.

9. The apparatus of claim 1, wherein the indicator of the deliberate change in the current pressure of the tire includes a mode signal receivable via a mode input switch activatable by the user.

10. A vehicle comprising:
a passenger compartment;
a drive system configured to motivate, accelerate, decelerate, stop, and steer the vehicle; and
an external tire pressure indicator including:
a target pressure specifier configured to specify a target pressure for a tire of the vehicle and generate a target pressure signal indicative of the target pressure;
a pressure monitor configured to receive the target pressure signal, a current pressure signal indicative of a current pressure of the tire, and an indicator of a deliberate change in the current pressure of the tire, the pressure monitor being further configured to compare the current pressure signal with the target pressure signal responsive to the indicator and generate a status signal indicative of a status of the current pressure signal relative to the target pressure signal; and an audio generator positioned on the vehicle, wherein the audio generator is configured to receive the status signal and to generate a sound audible outside of the passenger compartment of the vehicle that is indicative of the status signal;
wherein the indicator of the deliberate change in the current pressure of the tire includes an indicator received from a valve sensor configured to detect application of a pressure change device to a valve of the tire.

11. The vehicle of claim 10, wherein the target pressure specifier is configured to receive the target pressure from a source chosen from:
a user input; and
a store of recommended tire pressure.

12. The vehicle of claim 10, wherein the target pressure specifier includes:
a first target pressure setting for onroad travel and a second target pressure setting for offroad travel; and
a selector configured to receive a user mode selection of one of the first setting and the second setting.

13. The vehicle of claim 10, wherein the audio signal includes a first sound indicating when the current pressure is within a predetermined tolerance of the target pressure.

14. The vehicle of claim 13, wherein the audio signal includes one of:
a second sound indicating that the current pressure is less than the desired pressure; and
a third sound indicating that the current pressure is greater than the desired pressure.

15. The vehicle of claim 10, wherein the audio generator includes at least one transducer mountable outside of the passenger compartment of the vehicle and that is configured to generate the audio signal.

16. The vehicle of claim 15, wherein the external signal generator includes a front transducer mounted toward a front end of the vehicle and a rear transducer mounted toward a rear end of the vehicle.

17. The vehicle of claim 16, wherein the audio signal is generated via:
the front transducer when the indicator signals the deliberate change to the current pressure to the tire includes a front tire toward the front end of the vehicle; and
the rear transducer when the indicator signals the deliberate change to the current pressure to the tire includes a rear tire toward the rear end of the vehicle.

18. The vehicle of claim 10, wherein the indicator of the deliberate change in the current pressure of the tire includes a mode signal receivable via a mode input switch activatable by the user.

19. A method comprising:
receiving a target pressure signal indicative of a target pressure for a tire of a vehicle;
receiving a current pressure signal indicative of a current pressure of the tire;
receiving an indication of a deliberate change in the current pressure of the tire, wherein the indicator of the deliberate change in the current pressure of the tire includes an indicator received from a valve sensor configured to detect application of a pressure change device to a valve of the tire;
comparing the target pressure signal with the current pressure signal responsive to the indicator;
generating a status signal indicative of a status of the current pressure signal relative to the target pressure signal; and providing the status signal to an audio generator positioned on the vehicle, wherein the audio generator is configured to receive the status signal and to generate a sound audible outside of a passenger compartment of the vehicle that is indicative of the status signal.

20. The method of claim 19, further comprising receiving a setting from a user indicating whether the target pressure is for one of onroad travel and offroad travel, wherein the target pressure for onroad travel is different than the target pressure for offroad travel.

* * * * *